Patented Jan. 19, 1937

2,068,355

UNITED STATES PATENT OFFICE 2,068,355

VULCANIZATION OF RUBBER

Robert L. Sibley, Nitro, W. Va., assignor, by mesne assignments, to Monsanto Chemical Company, St. Louis, Mo., a corporation of Delaware No Drawing. Application August 6, 1935, Serial No. 34,941

24 Claims. (Cl. 18—53)

The present invention relates to new vulcanization accelerators, to a process of vulcanizing rubber and to the vulcanization products obtained with the aid of the said new vulcanization accelerators.

The new and preferred class of rubber vulcanization accelerators comprises the reaction products obtainable by reacting a methylol carbamide and a dithiocarbamic acid.

As typical examples of a methylol carbamide employed in the preparation of the preferred new class of accelerators are dimethylol carbamide, monomethylol carbamide, dimethylol thiocarbamide and monomethylol thiocarbamide. As typical examples of dithiocarbamic acids which are reactive with a methylol carbamide and form therewith the new class of vulcanization accelerators are dimethyl dithiocarbamic acid, diamyl dithiocarbamic acid, cyclopentamethylene dithiocarbamic acid, di-n-butyl dithiocarbamic acid, dicyclohexyl dithiocarbamic acid, dibenzyl dithiocarbamic acid, diethyl dithiocarbamic acid, ethyl cyclohexyl dithiocarbamic acid and the analogues and equivalents thereof.

The compounds of the present invention are obtainable by reacting varying amounts of a methylol carbamide and a dithiocarbamic acid. Preferably from one to two molecular proportions of the dithiocarbamic compound are reacted with one molecular proportion of a methylol carbamide.

The present invention includes the use of the preferred reaction products irrespective of the structure of the resulting product. Provided the reaction involved in the preparation thereof is a condensation with the elimination of water, it is believed the preferred accelerators may be assigned the following general formula

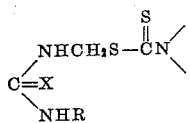

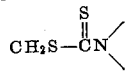

where X is a sulfur or oxygen atom and R is hydrogen, an alkyl, aryl, aralkyl or CH2OH radical or the grouping

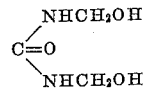

The following specific examples are to be understood as illustrative embodiments of the invention and not in any sense limitative of the scope thereof.

Example I

Dimethylol carbamide was prepared in substantially a theoretical yield by reacting substantially one molecular proportion of urea and substantially two molecular proportions of formaldehyde according to the method of Dixon, Journal of the Chemical Society 113, 247 (1918), wherein the urea and formaldehyde are mixed in a suitable reactor, just neutralized with dilute alkali hydroxide, and allowed to stand for a day or two at room temperature. Substantially one-half a molecular proportion of the dimethylol carbamide prepared as described was then added to an excess over substantially one-half a molecular proportion of an aqueous solution of an alkali metal salt, for example the sodium salt of dimethyl dithiocarbamic acid, preferably at a temperature of substantially 0° to 15° C. and the reaction mixture stirred until solution was complete, whereupon the solution was acidified to Congo red test paper with cooling preferably to a temperature of 0° to 10° C., using a suitable acid as hydrochloric acid. After allowing the reaction product to warm to room temperature and standing thereat for a convenient period of time, the precipitate so produced comprising the preferred reaction product was filtered, washed free of hydrochloric acid and dried at a temperature of 45° to 50° C. The product so obtained was found by analysis to contain 18.72% nitrogen and 28.58% sulfur.

It is believed the reaction involved in the preparation of the above material proceeds as follows, although the present invention is not limited to any theory as to formulation of the reactions involved in the preparation of the new and preferred class of accelerators:

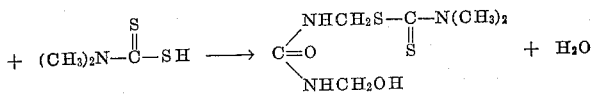

Other methods of preparing the new class of accelerators may be employed. Thus, the free dithiocarbamic acid may be initially prepared by a suitable process and the methylol carbamide added thereto.

The reaction product of dimethylol carbamide and dimethyl dithiocarbamic acid prepared as described above was incorporated in the usual manner in a rubber stock comprising

| | Parts |
|---|---|
| Pale crepe rubber | 100 |
| Zinc oxide | 5 |
| Sulfur | 2 |
| Red oxide | 0.25 |
| Stearic acid | 0.50 |
| Reaction product of equi-molecular proportions of dimethylol carbamide and dimethyl dithiocarbamic acid | 0.45 |

The rubber stock so obtained was vulcanized by heating for different periods of time at different steam pressures. The tests on the vulcanized rubber product follow in Table I.

*Table I*

| Cure | | Modulus of elasticity in lbs./in.² at elongations of— | | Tensile at break in lbs./in.² | Ultimate elong. percent |
|---|---|---|---|---|---|
| Time in mins. | Lbs. steam pressure | 300% | 500% | | |
| 15 | 5 | 325 | 1150 | 2340 | 835 |
| 20 | 5 | 428 | 1673 | 3130 | 815 |
| 30 | 5 | 640 | 2555 | 3420 | 750 |
| 60 | 5 | 758 | 3055 | 4350 | 770 |
| 15 | 20 | 610 | 2495 | 3430 | 750 |
| 30 | 20 | 605 | 2365 | 3600 | 770 |

From the above data it is seen that the new and preferred class of accelerators are exceptionally strong and function particularly well at the lower steam pressures and temperatures.

The preferred class of materials also possess the exceedingly desirable property of activating the cure of thiazole accelerators. A stock was compounded comprising

| | Parts |
|---|---|
| Smoked sheet rubber | 100 |
| Blanc fixe | 30 |
| Zinc oxide | 5 |
| Sulfur | 1.25 |
| Stearic acid | 1.5 |
| Mercapto-benzo-thiazole | 0.875 |
| Reaction product of substantially equi-molecular proportions of dimethylol carbamide and dimethyl dithiocarbamic acid | 0.075 |

The stock so obtained was vulcanized and the following results obtained on the cured rubber product.

*Table II*

| Cure | | Modulus of elasticity in lbs./in.² at elongations of— | | Tensile at break in lbs./in.² | Ultimate elong. Percent |
|---|---|---|---|---|---|
| Time in mins. | Lbs. steam pressure | 500% | 700% | | |
| 5 | 50 | 575 | 1913 | 3020 | 800 |
| 7 | 50 | 645 | 2140 | 3195 | 775 |
| 9 | 50 | 645 | 2090 | 3045 | 775 |

The above test data shows that the mixed accelerator comprising mercapto-benzo-thiazole activated by a small proportion of a dimethylol carbamide-dimethyl dithiocarbamic acid reaction product is a very strong accelerator. An identical stock but containing only the mercapto-benzo-thiazole as accelerator exhibits little cure under the same conditions of testing.

As a further example of the activating of thiazole accelerators by means of the new and preferred class of accelerators a stock was compounded comprising

| | Parts |
|---|---|
| Pale crepe rubber | 100 |
| Zinc oxide | 6 |
| Whiting | 60 |
| Sulfur | 2 |
| Stearic acid | 1.0 |
| Reaction product of one molecular proportion of dimethylol carbamide and two molecular proportions of mercapto-benzo-thiazole, as described in my pending application Serial No. 12,474 filed March 22, 1935 | 1.0 |
| Reaction product of substantially equi-molecular proportions of dimethylol carbamide and dimethyl dithiocarbamic acid | 0.15 |

The tensile and modulus data of the cured rubber product are given in Table III.

*Table III*

| Cure | | Modulus of elasticity in lbs./in.² at elongations of— | | Tensile at break in lb./in.² | Ultimate elong. percent |
|---|---|---|---|---|---|
| Time in mins. | Lbs. steam pressure | 400% | 600% | | |
| 20 | 20 | 683 | 2245 | 3005 | 655 |
| 30 | 20 | 708 | 2235 | 2850 | 645 |
| 40 | 20 | 675 | 2180 | 2720 | 640 |

As an identical stock with that above, with the exception that it contains only the said thiazole accelerator, exhibits substantially no vulcanization under the same conditions of testing, it is readily apparent that the new class of accelerating compounds are strong activators for thiazole accelerators.

As a still further example of the activation of thiazole accelerators by means of the new and preferred class of compounds a stock was compounded comprising

| | Parts |
|---|---|
| Pale crepe rubber | 100 |
| Zinc oxide | 8 |
| Sulfur | 2.5 |
| Stearic acid | 0.5 |
| Benzo-thiazyl-thiobenzoate | 0.5 |
| Reaction product of substantially equi-molecular proportions of dimethyl dithiocarbamic acid and dimethylol carbamide | 0.025 |

The compounded rubber stock was vulcanized and the following test data obtained thereon.

*Table IV*

| Cure | | Modulus of elasticity in lbs./in.² at elongations of— | | Tensile at break in lbs./in.² | Ultimate elong. percent |
|---|---|---|---|---|---|
| Time in mins. | Lbs. steam pressure | 500% | 700% | | |
| 30 | 20 | 146 | 314 | 1260 | 960 |
| 45 | 20 | 204 | 598 | 1750 | 885 |
| 60 | 20 | 273 | 865 | 1935 | 840 |
| 90 | 20 | 312 | 1115 | 2200 | 825 |

A stock identical with that employed above except that the benzothiazyl-thiobenzoate alone was employed as the accelerator is little vulcanized when subjected to the same vulcanization conditions, thus exhibiting the marked activating properties of the new class of materials.

*Example II*

As another specific example of the use of the preferred class of accelerators substantially one molecular proportion of dimethylol carbamide was added to substantially two molecular proportions of an aqueous solution of the sodium salt of dimethyl dithiocarbamic acid, preferably at a temperature of substantially 0° to 15° C., and maintained thereat until solution was complete, whereupon the solution was acidified with a suitable acid, for example hydrochloric acid, to Congo red test paper with cooling preferably to a temperature of 0° to 10° C. After allowing the reaction product to stand at said temperature for a convenient period of time, the precipitate produced was filtered therefrom while cold. The product so obtained, after drying at room temperature, was found on analysis to contain 16.33% nitrogen and 36.1% sulfur.

It is believed the reaction involved in the preparation of the above material proceeds as follows:

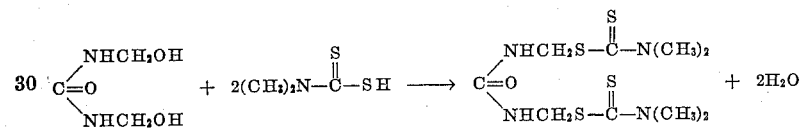

The reaction product of substantially one molecular proportion of dimethylol carbamide and substantially two molecular proportions of dimethyl dithiocarbamic acid prepared as above was incorporated in a rubber stock comprising

|  | Parts |
| --- | --- |
| Pale crepe rubber | 100 |
| Zinc oxide | 5 |
| Sulfur | 2 |
| Red oxide | 0.25 |
| Stearic acid | 0.5 |
| Reaction product of substantially one molecular proportion of dimethylol carbamide and substantially two molecular proportions of dimethyl dithiocarbamic acid | 0.45 |

The rubber stock so obtained was vulcanized by heating for different periods of time at different steam pressures. The tests on the vulcanized rubber product follow in Table V.

*Table V*

| Cure | | Modulus of elasticity in lbs./in.² at elongations of— | | Tensile at break in lbs./in.² | Ultimate elong. percent |
| --- | --- | --- | --- | --- | --- |
| Time in mins. | Lbs. steam pressure | 300% | 500% | | |
| 15 | 5 | 420 | 1510 | 2830 | 815 |
| 20 | 5 | 478 | 1885 | 3240 | 800 |
| 30 | 5 | 663 | 2530 | 3190 | 745 |
| 60 | 5 | 788 | 3240 | 3845 | 720 |
| 15 | 20 | 770 | 3040 | 3595 | 725 |
| 30 | 20 | 630 | 2605 | 3350 | 740 |

The reaction product of substantially one molecular proportion of dimethylol carbamide and substantially two molecular proportions of dimethyl dithiocarbamic acid has also been employed as an activator for thiazole accelerators. A rubber stock was compounded comprising

|  | Parts |
| --- | --- |
| Smoked sheet rubber | 100 |
| Blanc fixe | 30 |
| Zinc oxide | 5 |
| Sulfur | 1.25 |
| Stearic acid | 1.50 |
| Mercapto-benzo-thiazole | 0.875 |
| Dimethylol carbamide-dimethyl dithiocarbamic acid reaction product | .10 |

The stock thus compounded was vulcanized and the following tensile and modulus properties obtained thereon:

*Table VI*

| Cure | | Modulus of elasticity in lbs./in.² at elongations of— | | Tensile at break in lbs./in.² | Ultimate elong. percent |
| --- | --- | --- | --- | --- | --- |
| Time in mins. | Lbs. steam pressure | 500% | 700% | | |
| 5 | 50 | 810 | 2605 | 3145 | 735 |
| 7 | 50 | 750 | 2480 | 3235 | 750 |
| 9 | 50 | 750 | 2420 | 3065 | 745 |

The results of the tests in Table VI show further that the new and preferred class of accelerators have marked activation for thiazole accelerators as an identical stock with that above but containing only 0.875 part of mercapto-benzo-thiazole alone as accelerator shows little cure under the same conditions of testing.

As further specific embodiments of the invention the following products have been prepared in a manner analogous to that hereinbefore set forth:

(A) Reaction product of substantially two molecular proportions of diamyl dithiocarbamic acid and substantially one molecular proportion of dimethylol carbamide.

(B) Reaction product of substantially equimolecular proportions of diamyl dithiocarbamic acid and dimethylol carbamide.

(C) Reaction product of substantially two molecular proportions of cyclopentamethylene dithiocarbamic acid and substantially one molecular proportion of dimethylol carbamide.

(D) Reaction product of substantially equimolecular proportions of cyclopentamethylene dithiocarbamic acid and dimethylol carbamide.

(E) Reaction product of substantially equimolecular proportions of dimethyl dithiocarbamic acid and mono methylol carbamide.

(F) Reaction product of substantially two molecular proportions of di-n-butyl dithiocarbamic acid and substantially one molecular proportion of dimethylol carbamide.

(G) Reaction product of substantially equimolecular proportions of di-n-butyl dithiocarbamic acid and dimethylol carbamide.

(H) Reaction product of substantially two molecular proportions of diethyl dithiocarbamic acid and substantially one molecular proportion of dimethylol carbamide.

(I) Reaction product of substantially equimolecular proportions of diethyl dithiocarbamic acid and dimethylol carbamide.

(J) Reaction product of substantially two molecular proportions of dimethyl dithiocarbamic acid and substantially one molecular proportion of dimethylol thiocarbamide.

(K) Reaction product of substantially equi-molecular proportions of dimethyl dithiocarbamic acid and dimethylol thiocarbamide.

The use of accelerators (A), (B), (C), (D), (E), (F), (G), (H), (I), (J) and (K) given above either alone or in conjunction with thiazole accelerators, as for example mercapto-benzo-thiazole and its derivatives, is included in this invention.

As illustrative of their use portions of each of the above products were separately incorporated in a base stock comprising

| | Parts |
|---|---|
| Smoked sheet rubber | 100 |
| Zinc oxide | 5 |
| Sulfur | 3 |
| Stearic acid | 0.5 |
| Accelerator | 0.7 |

The stocks so compounded were vulcanized and the following tensile and modulus data obtained on the cured rubber product.

*Table VII*

| Accelerator | Cure | | Modulus of elasticity in lbs./in.$^2$ at elongations of— | | Tensile at break in lbs./in.$^2$ | Ultimate elong. percent |
|---|---|---|---|---|---|---|
| | Mins. | Steam pressure lbs./in.$^2$ | 500% | 700% | | |
| A | 20 | 5 | 126 | 303 | 1300 | 975 |
| B | 20 | 5 | 107 | 233 | 1205 | 1030 |
| C | 20 | 5 | 160 | 425 | 1575 | 965 |
| D | | | | | | |
| E | 20 | 5 | 322 | 1200 | 2630 | 835 |
| F | 20 | 5 | 66 | 118 | 408 | 1020 |
| G | 20 | 5 | 125 | 275 | 990 | 945 |
| H | 20 | 5 | 383 | 1520 | 2990 | 810 |
| I | 20 | 5 | 238 | 745 | 2075 | 880 |
| J | 20 | 5 | 358 | 1170 | 2830 | 855 |
| K | 20 | 5 | 347 | 1235 | 2640 | 845 |
| A | 30 | 5 | 214 | 678 | 1690 | 870 |
| B | 30 | 5 | 186 | 550 | 1665 | 910 |
| C | 30 | 5 | 253 | 851 | 2120 | 875 |
| D | 30 | 5 | 145 | 280 | 1010 | 1015 |
| E | 30 | 5 | 455 | 1420 | 3240 | 780 |
| F | 30 | 5 | 95 | 213 | 725 | 945 |
| G | 30 | 5 | 163 | 425 | 1515 | 930 |
| H | 30 | 5 | 580 | 2450 | 3580 | 765 |
| I | 30 | 5 | 333 | 1180 | 2715 | 840 |
| J | 30 | 5 | 461 | 1910 | 3410 | 800 |
| K | 30 | 5 | 426 | 1745 | 3265 | 815 |
| A | 60 | 5 | 537 | 2130 | 2370 | 725 |
| B | 60 | 5 | 405 | 1625 | 2310 | 750 |
| C | 60 | 5 | 489 | 1930 | 2555 | 740 |
| D | 60 | 5 | 240 | 705 | 1595 | 860 |
| E | 60 | 5 | 735 | 3050 | 3050 | 700 |
| F | 60 | 5 | 235 | 870 | 1560 | 800 |
| G | 60 | 5 | 316 | 1195 | 2185 | 800 |
| H | 60 | 5 | 953 | 3840 | 3840 | 700 |
| I | 60 | 5 | 565 | 2515 | 3390 | 750 |
| J | 60 | 5 | 790 | 3300 | 4040 | 740 |
| K | 60 | 5 | 681 | 3055 | 4100 | 770 |

From the data hereinbefore set forth, it is apparent that the preferred class of materials constitute an important class of rubber vulcanization accelerators which are particularly adapted for use at the lower steam pressures, and further possess activating properties for thiazole accelerators.

The present invention is not limited to the specific examples hereinbefore set forth. Other ratios of the compounding ingredients than those mentioned in the examples as well as other known fillers, pigments and the like may be employed in the production of various types of rubber compounds and are apparent to those skilled in the art to which this invention pertains. The present invention is limited solely by the following claims.

What is claimed is:

1. A method of vulcanizing rubber which comprises heating rubber and sulfur in the presence of a rubber vulcanization accelerator comprising a product obtainable by reacting a methylol carbamide, the carbamyl carbon atom of which is directly joined to one member of a group consisting in sulfur and oxygen atoms, and a dithiocarbamic acid.

2. A method of vulcanizing rubber which comprises heating rubber and sulfur in the presence of a rubber vulcanization accelerator comprising a product obtainable by reacting a methylol carbamide, the carbamyl carbon atom of which is directly joined to one member of a group consisting in sulfur and oxygen atoms, and a dialkyl substituted dithiocarbamic acid.

3. A method of vulcanizing rubber which comprises heating rubber and sulfur in the presence of a rubber vulcanization accelerator comprising a product obtainable by reacting a dimethylol carbamide, the carbamyl carbon atom of which is directly joined to one member of a group consisting in sulfur and oxygen atoms, and a disubstituted dithiocarbamic acid.

4. A method of vulcanizing rubber which comprises heating rubber and sulfur in the presence of a rubber vulcanization accelerator comprising a product obtainable by reacting a dimethylol carbamide, the carbamyl carbon atom of which is directly joined to one member of a group consisting in sulfur and oxygen atoms, and an alkyl substituted dithiocarbamic acid.

5. A method of vulcanizing rubber which comprises heating rubber and sulfur in the presence of a rubber vulcanization accelerator comprising a product obtainable by reacting dimethylol carbamide and dimethyl dithiocarbamic acid.

6. A method of vulcanizing rubber which comprises heating rubber and sulfur in the presence of a rubber vulcanization accelerator comprising a product obtainable by reacting substantially equi-molecular proportions of dimethylol carbamide and dimethyl dithiocarbamic acid.

7. A method of vulcanizing rubber which comprises heating rubber and sulfur in the presence of a rubber vulcanization accelerator comprising a product obtainable by reacting substantially one molecular proportion of dimethylol carbamide and substantially two molecular proportions of dimethyl dithiocarbamic acid.

8. A method of vulcanizing rubber which comprises heating rubber and sulfur in the presence of a rubber vulcanization accelerator comprising a product obtainable by reacting substantially equi-molecular proportions of dimethylol thiocarbamide and dimethyl dithiocarbamic acid.

9. The vulcanized rubber product produced by heating rubber and sulfur in the presence of a rubber vulcanization accelerator comprising a product obtainable by reacting a methylol carbamide, the carbamyl carbon atom of which is directly joined to one member of a group consisting in sulfur and oxygen atoms, with a dithiocarbamic acid.

10. The vulcanized rubber product produced by heating rubber and sulfur in the presence of a rubber vulcanization accelerator comprising a product obtainable by reacting a methylol carbamide, the carbamyl carbon atom of which is directly joined to one member of a group consisting in sulfur and oxygen atoms, and a dialkyl substituted dithiocarbamic acid.

11. The vulcanized rubber product produced by heating rubber and sulfur in the presence of a rubber vulcanization accelerator comprising a product obtainable by reacting a dimethylol carbamide, the carbamyl carbon atom of which is directly joined to one member of a group consisting in sulfur and oxygen atoms, and a disubstituted dithiocarbamic acid.

12. The vulcanized rubber product produced by heating rubber and sulfur in the presence of a rubber vulcanization accelerator comprising a product obtainable by reacting a dimethylol carbamide, the carbamyl carbon atom of which is directly joined to one member of a group consisting in sulfur and oxygen atoms, and an alkyl substituted dithiocarbamic acid.

13. The vulcanized rubber product produced by heating rubber and sulfur in the presence of a rubber vulcanization accelerator comprising a product obtainable by reacting dimethylol carbamide and dimethyl dithiocarbamic acid.

14. The vulcanized rubber product produced by heating rubber and sulfur in the presence of a rubber vulcanization accelerator comprising a product obtainable by reacting substantially equimolecular proportions of dimethylol carbamide and dimethyl dithiocarbamic acid.

15. The vulcanized rubber product produced by heating rubber and sulfur in the presence of a rubber vulcanization accelerator comprising a product obtainable by reacting substantially one molecular proportion of dimethylol carbamide and substantially two molecular proportions of dimethyl dithiocarbamic acid.

16. The vulcanized rubber product produced by heating rubber and sulfur in the presence of a rubber vulcanization accelerator comprising a product obtainable by reacting substantially equimolecular proportions of dimethylol thiocarbamide and dimethyl dithiocarbamic acid.

17. Vulcanization accelerators comprising the products obtainable by the reaction of a methylol carbamide, the carbamyl carbon atom of which is directly joined to one member of a group consisting in sulfur and oxygen atoms, and a dithiocarbamic acid.

18. Vulcanization accelerators comprising the products obtainable by the reaction of a methylol carbamide, the carbamyl carbon atom of which is directly joined to one member of a group consisting in sulfur and oxygen atoms, and a dialkyl substituted dithiocarbamic acid.

19. Vulcanization accelerators comprising the products obtainable by the reaction of a dimethylol carbamide, the carbamyl carbon atom of which is directly joined to one member of a group consisting in sulfur and oxygen atoms, and a dialkyl substituted dithiocarbamic acid.

20. Vulcanization accelerators comprising the products obtainable by the reaction of dimethylol carbamide and dimethyl dithiocarbamic acid.

21. A vulcanization accelerator possessing the structure $$\begin{array}{c} \text{NHCH}_2\text{S}-\overset{\overset{\displaystyle S}{\|}}{\text{C}}-\text{N}< \\ \text{C}=\text{X} \\ \text{NHR} \end{array}$$

where X is a sulfur or oxygen atom and R is hydrogen, an alkyl, aryl, aralkyl or CH$_2$OH radical or the grouping $$\text{CH}_2\text{S}-\overset{\overset{\displaystyle S}{\|}}{\text{C}}-\text{N}<$$

22. A vulcanization accelerator possessing the structure $$\begin{array}{c} \text{NHCH}_2\text{S}-\overset{\overset{\displaystyle }{\underset{\displaystyle \|}{\text{C}}}}{}-\text{N}(\text{CH}_3)_2 \\ \text{C}=\text{O} \quad\quad \text{S} \\ \text{NHCH}_2\text{OH} \end{array}$$

23. A vulcanization accelerator possessing the structure $$\begin{array}{c} \text{NHCH}_2\text{S}-\overset{\overset{\displaystyle }{\underset{\displaystyle \|}{\text{C}}}}{}-\text{N}(\text{CH}_3)_2 \\ \text{C}=\text{O} \quad\quad \text{S} \\ \text{NHCH}_2-\overset{\overset{\displaystyle }{\underset{\displaystyle \|}{\text{C}}}}{}-\text{N}(\text{CH}_3)_2 \\ \text{S} \end{array}$$

24. A vulcanization accelerator possessing the structure $$\begin{array}{c} \text{NHCH}_2\text{S}-\overset{\overset{\displaystyle }{\underset{\displaystyle \|}{\text{C}}}}{}-\text{N}(\text{CH}_3)_2 \\ \text{C}=\text{S} \quad\quad \text{S} \\ \text{NHCH}_2\text{S}-\overset{\overset{\displaystyle }{\underset{\displaystyle \|}{\text{C}}}}{}-\text{N}(\text{CH}_3)_2 \\ \text{S} \end{array}$$

ROBERT L. SIBLEY.